(12) United States Patent
Schuettenberg

(10) Patent No.: US 11,801,718 B2
(45) Date of Patent: *Oct. 31, 2023

(54) LOW PROFILE TROLLEY FOR A TOW SADDLE

(71) Applicant: ATC Transportation LLC, Pleasant Prairie, WI (US)

(72) Inventor: Donald W. Schuettenberg, Hot Springs Village, AR (US)

(73) Assignee: ATC Transportation LLC, Pleasant Prairie, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/584,022

(22) Filed: Jan. 25, 2022

(65) Prior Publication Data

US 2022/0144027 A1    May 12, 2022

Related U.S. Application Data

(63) Continuation of application No. 16/516,044, filed on Jul. 18, 2019, now Pat. No. 11,247,517.

(60) Provisional application No. 62/701,196, filed on Jul. 20, 2018.

(51) Int. Cl.
| | | |
|---|---|---|
| B60D 1/01 | (2006.01) | |
| B60D 1/14 | (2006.01) | |
| B60D 1/145 | (2006.01) | |
| B60D 1/24 | (2006.01) | |
| B60D 1/18 | (2006.01) | |

(52) U.S. Cl.
CPC ............. B60D 1/01 (2013.01); B60D 1/143 (2013.01); B60D 1/145 (2013.01); B60D 1/187 (2013.01); B60D 1/24 (2013.01)

(58) Field of Classification Search
CPC .......... B60D 1/01; B60D 1/143; B60D 1/145; B60D 1/187; B60D 1/24
See application file for complete search history.

(56) References Cited

U.S. PATENT DOCUMENTS

| | | | |
|---|---|---|---|
| 4,762,192 A * | 8/1988 | Maxwell | B62D 59/04 |
| | | | 180/14.2 |
| 4,861,221 A | 8/1989 | Krisa | |
| 4,949,985 A | 8/1990 | Lichter | |
| 5,163,803 A | 11/1992 | Marola | |
| 5,401,050 A | 3/1995 | Baker | |
| 7,611,159 B2 | 11/2009 | Schuettenberg | |
| 7,637,524 B2 | 12/2009 | Schuettenberg | |
| 7,789,411 B2 | 9/2010 | Schuettenberg | |
| 8,267,419 B2 | 9/2012 | Schuettenberg | |
| 8,371,599 B2 | 2/2013 | Duvall et al. | |
| 8,876,139 B2 | 11/2014 | Duvall et al. | |

(Continued)

FOREIGN PATENT DOCUMENTS

| | | |
|---|---|---|
| CA | 2889383 | 12/2015 |

*Primary Examiner* — Kevin Hurley
*Assistant Examiner* — Michael R Stabley
(74) *Attorney, Agent, or Firm* — Reinhart Boerner Van Deuren s.c.

(57) ABSTRACT

A trolley that couples to a tow saddle is provided. The trolley includes an upper plate and a lower plate. The upper and lower plate are secured against a rear portion of a tow saddle. One or more support bars are coupled to the upper plate. The bars provide structural support for the upper plate and deflect a chain that transits apertures in the upper plate.

19 Claims, 8 Drawing Sheets

(56) References Cited

U.S. PATENT DOCUMENTS

| | | |
|---|---|---|
| 9,114,677 B2 | 8/2015 | Schuettenberg |
| 9,381,958 B2 | 7/2016 | Schuettenberg |
| 9,637,039 B1 | 5/2017 | Vildosola et al. |
| 10,179,532 B2 | 1/2019 | Schuettenberg |
| 2016/0304023 A1 | 10/2016 | Schuettenberg |

* cited by examiner

LOW PROFILE TROLLEY FOR A TOW SADDLE

RELATED APPLICATIONS

This application is a continuation of U.S. application Ser. No. 16/516,044, filed Jul. 18, 2019, which claims the benefit of and priority to U.S. Provisional Application No. 62/701,196, filed Jul. 20, 2018, each of which is incorporated herein by reference in its entirety.

BACKGROUND OF THE INVENTION

The present disclosure relates generally to trolleys for tow truck saddles. The present disclosure relates specifically to an apparatus that facilitates attaching a tow truck saddle to a truck being towed. When multiple trucks need to be moved from one location to another, tow truck saddles may be used so that a driver is not needed to drive each truck.

SUMMARY OF THE INVENTION

One embodiment of this disclosure relates to a front tow extended saddle. The tow saddle includes front, middle and rear portions. The front portion is mounted to a truck doing the towing. A truck being towed is mounted to the rear portion. The middle portion secures the front portion to the rear portion.

A trolley is secured to a top of the rear portion. The trolley has an upper plate and a supplemental plate rigidly secured to a top surface of the upper plate. The trolley facilitates using a chain to secure the towed truck to the tow saddle. The supplemental plate provides structural support to the upper plate. In various embodiments the trolley includes multiple supplemental plates welded to the upper plate. The trolley also includes a lower plate. The upper and lower plates are secured together via a fastener, such as a bolt. When secured together, the upper and lower plates pinch and are secured against opposing upper skirts of the rear portion's rails. The trolley is also secured by chain to a cross-bar that is secured to two frame rails of the towed truck.

In one embodiment, the upper plate and supplemental plates have two pairs of apertures to receive the chain. Between each of the pairs of apertures is a support element, such as a bar, to provide support to the upper plate and supplemental plate(s).

In one embodiment, the bolt that secures the upper and lower plates together passes through apertures in the upper plate and lower plate, but the bolt does not pass through an aperture in the supplemental plate. Therefore, the upper profile of the bolt is reduced, reducing the likelihood of the bolt damaging the under-carriage of the towed truck.

The lower plate includes two ribs that protrude from a top surface of the lower plate towards the upper plate. The ribs keep the trolley aligned with respect to opposing skirts of the rear rails. The ribs have a primary longitudinal axis that is generally parallel to the primary axis of the rear portion of the tow saddle. The ribs have a height that is less than a width of the opposing skirts that the upper and lower plates are secured to. Therefore, the height of the ribs does not prevent the upper and lower plates from being compressed directly against the opposing skirts of the rear portion of the tow saddle.

In one embodiment, the trolley includes two supplemental plates. The supplemental plates are attached to the top surface of the upper plate. The supplemental plate has an interior edge that is generally coplanar with outer peripheral edges of the lower plate's ribs.

In one embodiment, the trolley includes an upper plate and a lower plate, and no supplemental plate(s) are coupled to the upper plate. The upper plate is thicker than the upper plate in the embodiment that includes supplemental plate(s).

Additional features and advantages will be set forth in the detailed description which follows, and, in part, will be readily apparent to those skilled in the art from the description or recognized by practicing the embodiments as described in the written description as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and together with the description serve to explain principles and operation of the various embodiments.

DETAILED DESCRIPTION

Referring generally to the figures, an embodiment of a trolley for a tow saddle is shown. In general, tow saddles are used by one truck to tow one or more other trucks. The trolley is a component of the tow saddle that facilitates securing the tow saddle to the towed truck. The trolley facilitates attaching a chain between the tow saddle and a cross-bar that is placed across the frame rails of the towed truck. The trolley is fixedly secured to a top surface of a rear portion of the tow saddle. One or more embodiments of the trolley described herein have a low profile, thereby reducing the likelihood of the trolley damaging the under-carriage of the towed truck.

In one embodiment, the trolley includes an upper plate and a lower plate. The upper plate includes two supplemental plates that are secured to a top surface of the upper plate. The trolley is attached to opposing skirts of a pair of rails in a rear portion of a tow saddle. The opposing skirts extend towards each, leaving a space between them. The upper plate is placed above the opposing skirts and the lower plate is placed below the opposing skirts.

The upper plate is then secured to the lower plate, such as via bolts. To reduce a height of the bolt above the rear rails, the bolt passes through the upper plate at locations that are not bolstered by a supplemental plate. As a result, the height of the bolt is reduced and correspondingly the chances of the bolt damaging the under-carriage of the towed truck is similarly reduced.

In one embodiment the trolley does not include supplemental plates coupled to the upper plate and does include a relatively thicker upper plate compared to alternate embodiments. This slightly thicker configuration provides structural strength that compensates for the lack of supplemental plates coupled to the upper plate in this embodiment.

Figure 1:
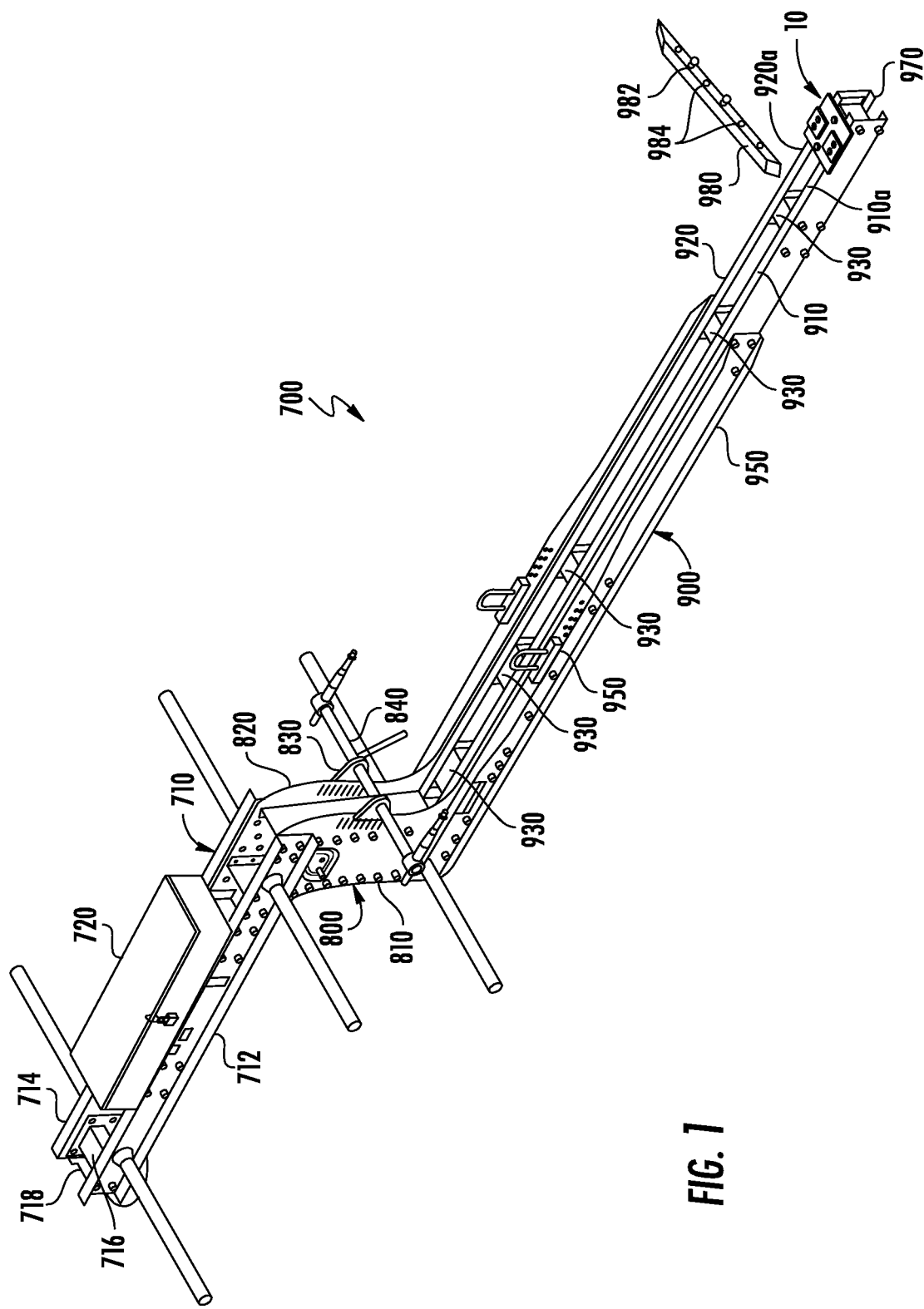
FIG. 1 is a perspective view of a tow saddle according to an exemplary embodiment.
Figure 2:
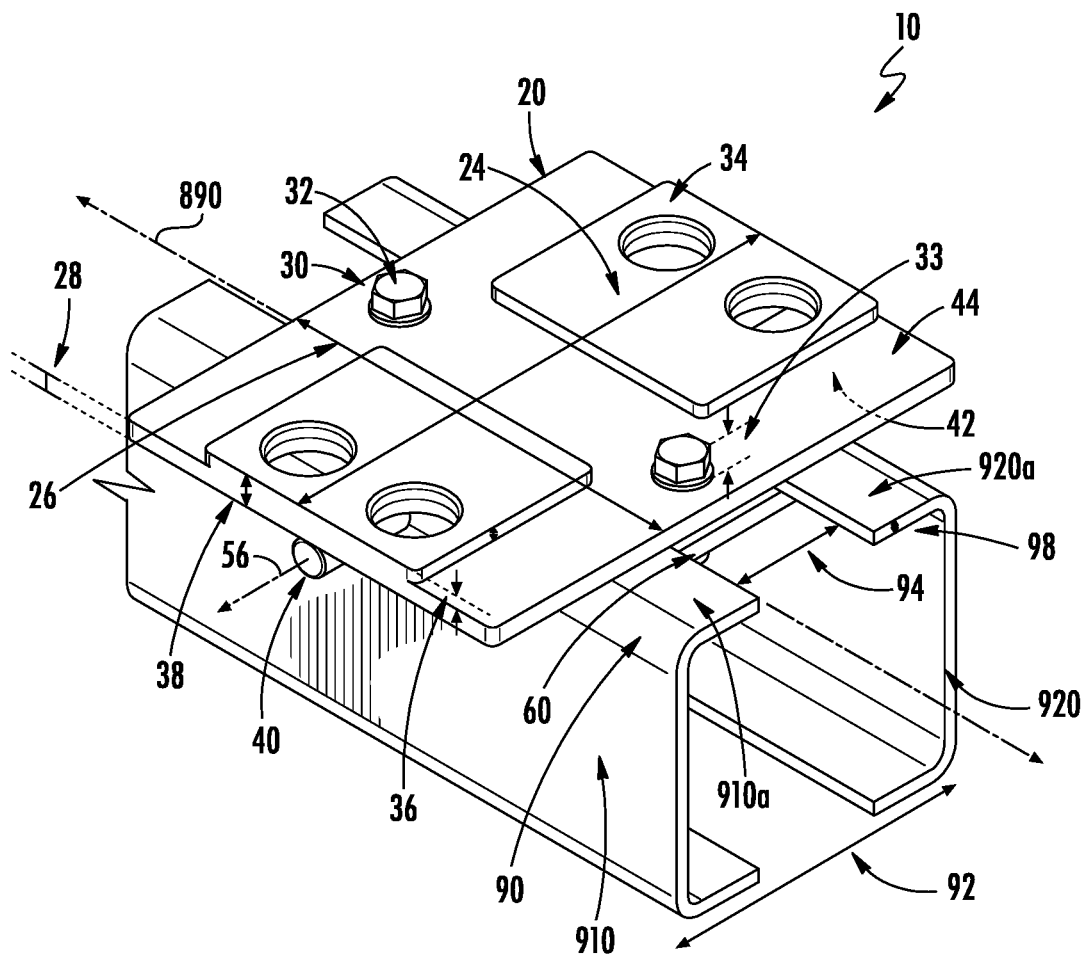
FIG. 2 is a detailed perspective view of the trolley and rear rails of FIG. 1, according to an exemplary embodiment.
Figure 3:
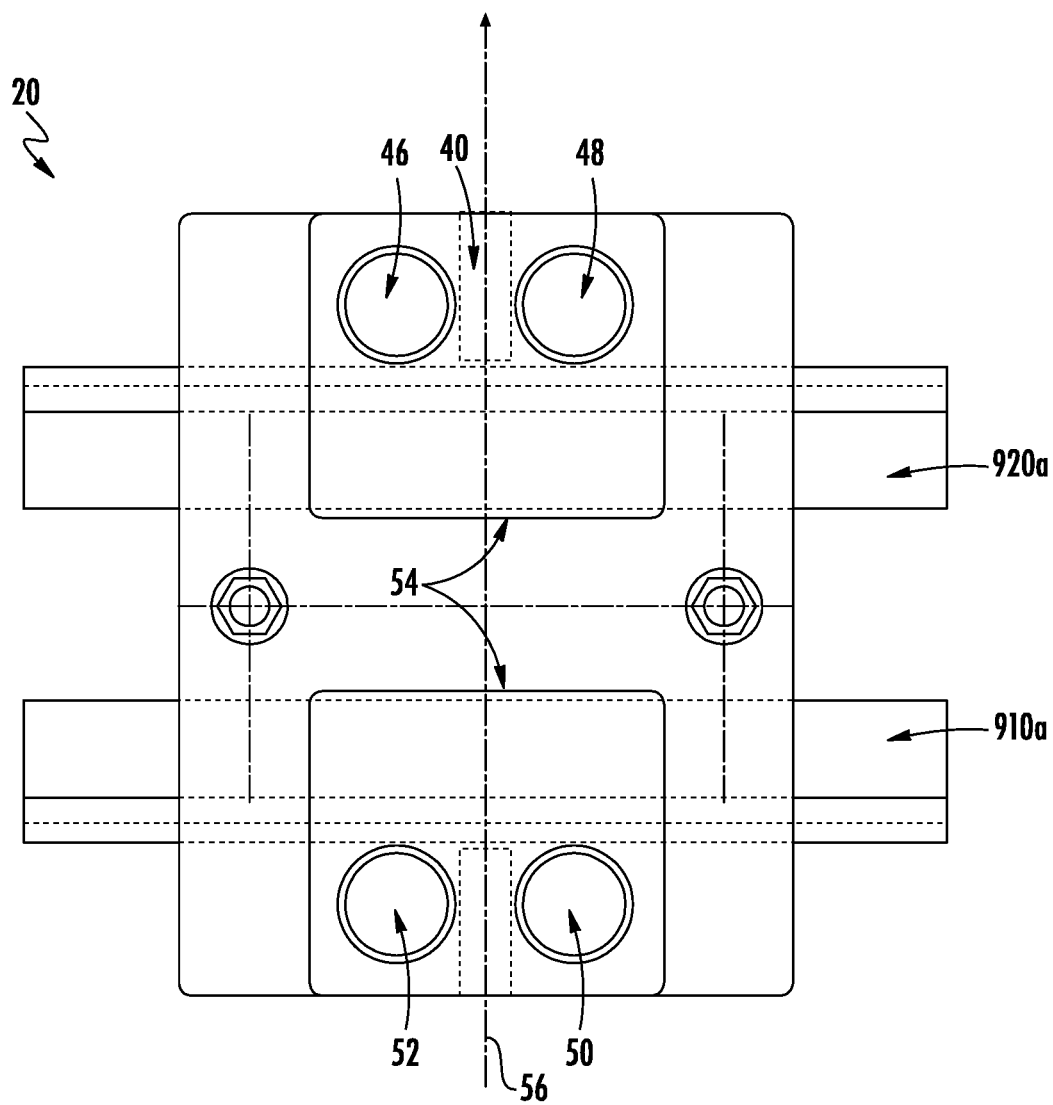
FIG. 3 is a top schematic view of the upper plate and rails of FIG. 2, according to an exemplary embodiment.

Referring to FIG. 1, an embodiment of a tow saddle is disclosed. As shown in FIG. 1, saddle 700 includes forward portion 710, middle portion 800 and rear portion 900. Forward portion includes left and right forward rails 712 and 714, respectively, which are joined by a plurality of cross members 716. A front bracket 718 is secured to the forward end of forward portion 710. A security compartment 720 may optionally be mounted on rails 712 and 714. Although not shown in this figure, apertures in rails 712 and 714 may be provided to accommodate tubes on which to dispose a fender tarp assembly.

Middle portion 800 includes side plates 810 and 820. Middle portion 800 includes a bracket 830 used to accommodate a rod 840. A plurality of tow pins are disposed on the rod 840 for adapting a height of the towed vehicle. A jack assembly may be disposed between the two side plates 810 and 820 of the vertical portion. In such embodiments, the jack assembly is used to lower or raise the towed vehicle for loading or unloading.

Rear portion 900 includes pairs of left and right rails 910 and 920. Left rear inner rail 910 and left rear outer rail are bolted together, sandwiching the lower region of left side plate 810. Similarly, right rear inner rail 920 and right rear outer rail are bolted together, sandwiching the lower region of right side plate 820. Preferably, inner rear rails 910 and 920 extend further rearward than outer rear rails. The left and right rear rails 910 and 920 are spaced apart a narrow distance and fit within the frame of the towed vehicle and are joined by plurality of cross members 930.

V-notched blocks 950 may be mounted onto the left and right rear outer rails to receive a front axle of the towed vehicle. The axle can be secured in the blocks through U-bolts 960. The rear ends of the inner rear rails 910 and 920 are bolted together by an end cross member 970. Described in more detail below and illustrated in FIGS. 2-6, trolley 10 is secured above and between opposing skirts 910a and 920a of the respective inner rear rails 910 and 920.

Referring now to FIGS. 2-6, one embodiment of trolley 10 includes upper plate 20, supplemental plates 34, and lower plate 60. Upper plate 20 and lower plate 60 are secured together via fasteners, shown as bolts 32, which transit aperture 30 of upper plate 20 and aperture 70 of lower plate 60. When secured together, upper plate 20 and lower plate 60 pinch against upper edge 910a and upper edge 920a, securing trolley 10 to rear rails 910 and 920.

Supplemental plates 34 are secured against (e.g., welded to) top surface 44 of upper plate 20 to provide additional structural support. The combination of upper plate 20 and supplemental plates 34 has a height 38, which includes the height 28 of upper plate 20 and the height 36 of supplemental plates 34. Bolt 32 extends height 33 above the upper surface 44 of upper plate 20. A result of using supplemental plates 34, rather than making upper plate 20 uniformly thicker, is that the height 33 of bolt 32 is reduced. In one embodiment, height 33 of bolt 32 is approximately 20% higher than height 38 of supplemental plate 34 (e.g., 17/16 inches compared to 14/16 inches). This produces the beneficial result of trolley 10 extending a lower height above opposing skirts 910a and 920a, and the chance of trolley 10 contacting and/or damaging the under-carriage of the towed truck is correspondingly reduced. In other words, the upper end of bolt 32 presents a lower profile relative to the rest of trolley 10 that decreases the chance that bolt 32 contacts the towed truck as the towed truck is being loaded on or offloaded from a tow saddle equipped with trolley 10.

Supplemental plates 34 are coupled to upper plate 20 on opposing sides. In one embodiment, inwardly-facing walls 54 of supplemental walls 34 are closer than width 94 of inner rear rails 910 and 920.

Upper plate 20 extends width 24 perpendicularly to longitudinal axis 890, which is further than width 92 of rear rails 910 and 920. Upper plate extends length 26 along the longitudinal axis 890 of the left and right rear rails 910 and 920. Upper plate 20 is supported by support bars 40, which are located beyond the outer periphery of rear rails 910 and 920.

Figure 4:
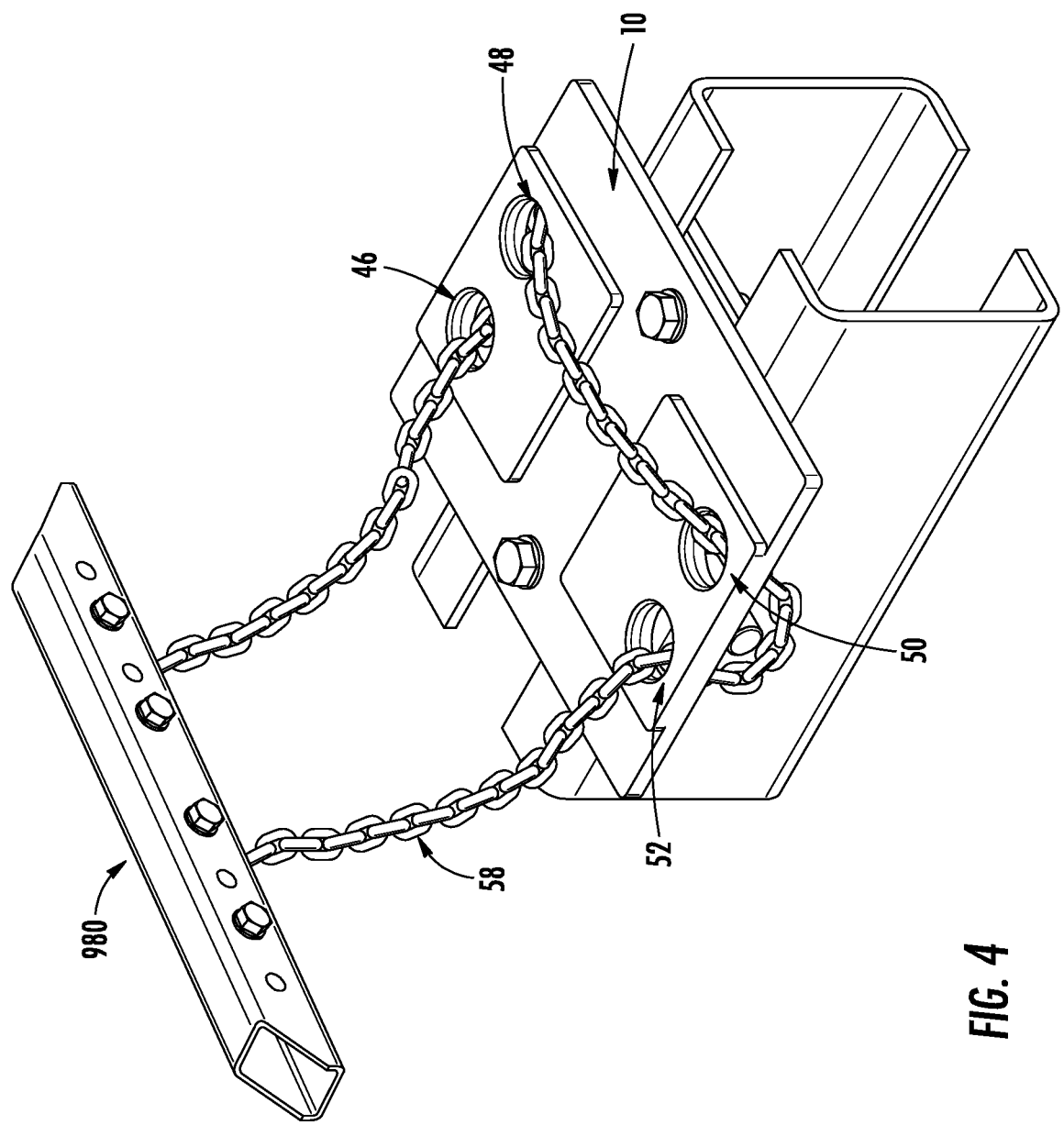
FIG. 4 is a detailed and annotated perspective view of a trolley and cross-bar, according to an exemplary embodiment.
Figure 5:
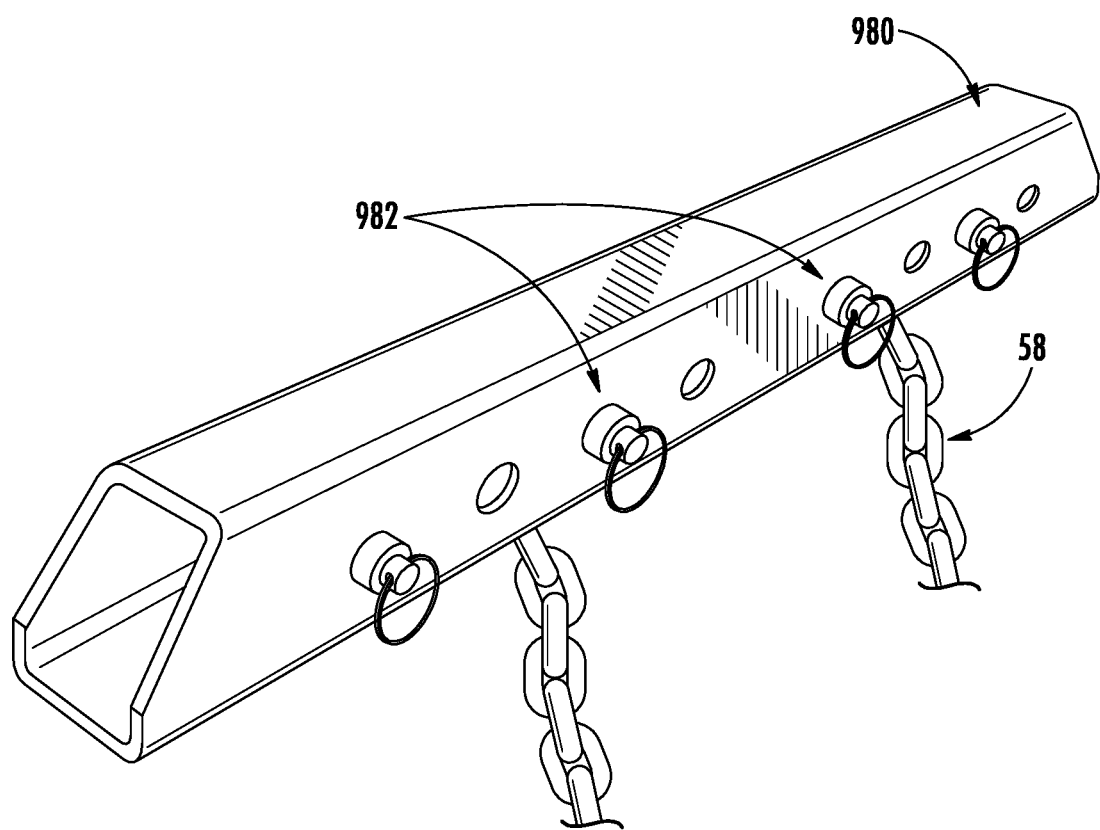
FIG. 5 is an image of a cross-bar and a chain, according to exemplary embodiments.

Turning to FIG. 4-5, an elongate flexible support component, shown as chain 58, transits the holes in supplemental plates 34 and upper plate 20 to secure trolley 10 to a towed truck. Chain 58 detachably secures trolley 10 to cross-bar 980. Cross-bar 980 is secured against the frame rails of the towed truck. In one embodiment, chain 58 transits down apertures 46 and 50, and up apertures 48 and 52 (best shown in FIG. 3). Chain 58 transits from aperture 48 to aperture 50 above upper plate 20. Chain 58 transits from aperture 46 to aperture 48 and from aperture 50 to aperture 52 under upper plate 20 and around support bars 40. Support bar 40 provides a deflection for chain 58 between the apertures, as chain 58 extends slightly vertically down to navigate around support bar 40. Support bars 40 are secured against (e.g., welded to) bottom surface 44 of upper plate 20 to provide structural support against the forces exerted by the chain on trolley 10. Support bars 40 define longitudinal axis 56 that is perpendicular to longitudinal axis 890 of rear rails 910 and 920. The rest of chain 58 is detachably coupled to support bar 980, such as by transiting the internal space of support bar 980 around clevis hooks/pins 982 (best shown in FIG. 5), which are secured in apertures 984. Various numbers of clevis hooks/pins 982 may be used and remain consistent with this disclosure, including for example any number of clevis hooks/pins 982 (e.g., 1-5).

Figure 6:
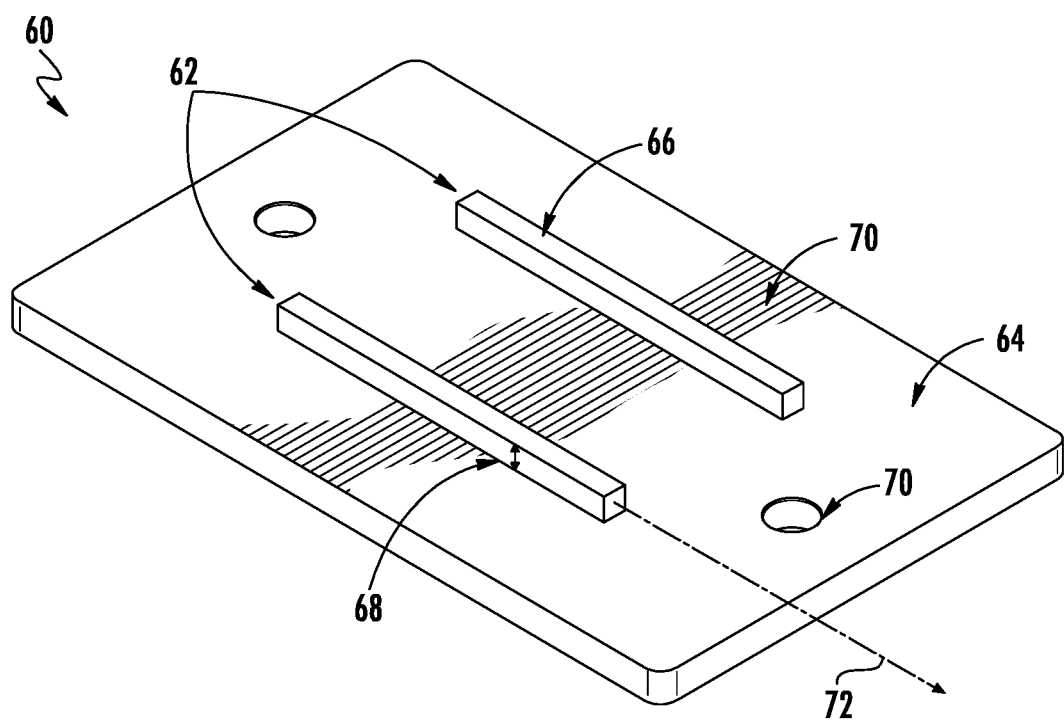
FIG. 6 is a perspective view of a lower plate of the trolley of FIG. 2, according to an exemplary embodiment.

Turning to FIG. 6, lower plate 60 includes apertures 70 that are used to secure lower plate 60 to upper plate 20. Ribs 62 are secured against the top surface 64 of lower plate 60 and extend upwardly from top surface 64. Ribs 62 include a primary longitudinal axis 72 that is generally parallel to the primary longitudinal axis 890 of rear rails 910 and 920. When trolley 10 is secured to rear rails 910 and 920, ribs 62 are positioned between rear rails 910 and 920 and extend along the interior edge of rear rails 910 and 920.

Ribs 62 have a height 68 that is less than the height 98 of rails 910 and 920 (best shown in FIG. 5). As a result, upper surface 66 of ribs 62 do not prevent upper plate 20 and lower plate 60 from pressing against opposing skirts 910a and 920a when trolley 10 is secured to rear rails 910 and 920.

Figure 7:
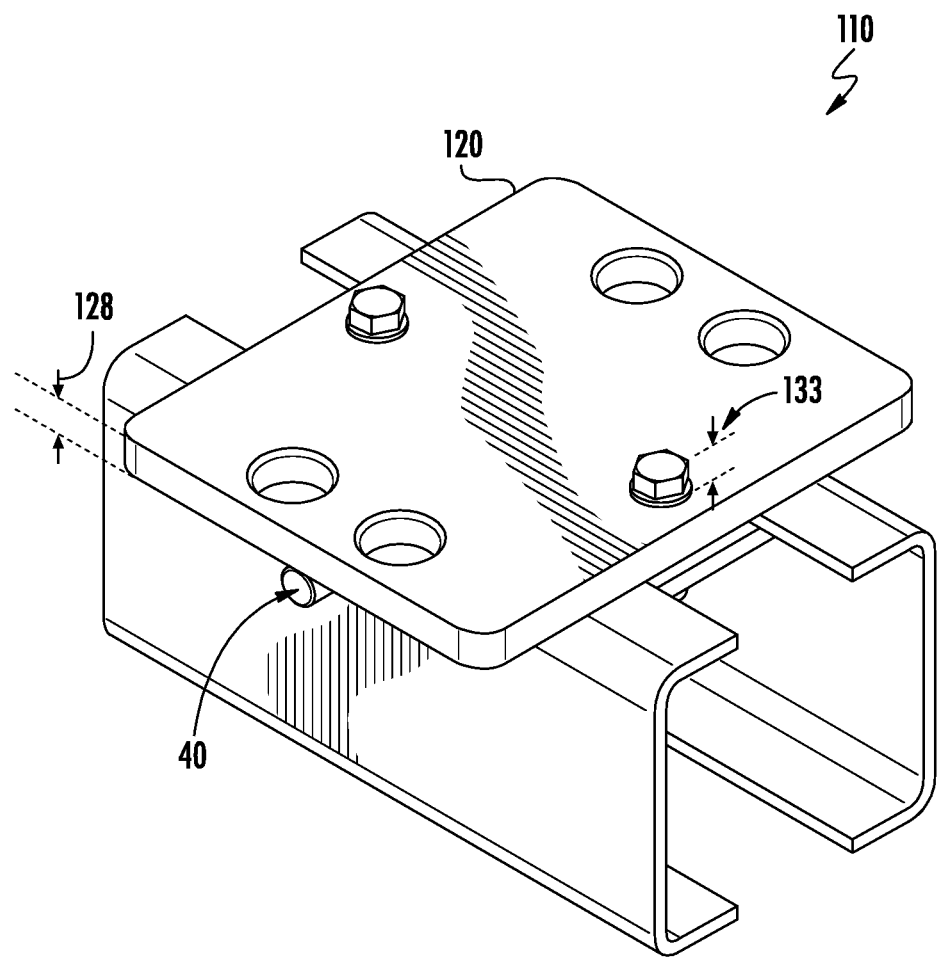
FIG. 7 is a detailed perspective view of a trolley and rear rails, according to an exemplary embodiment.
Figure 8:
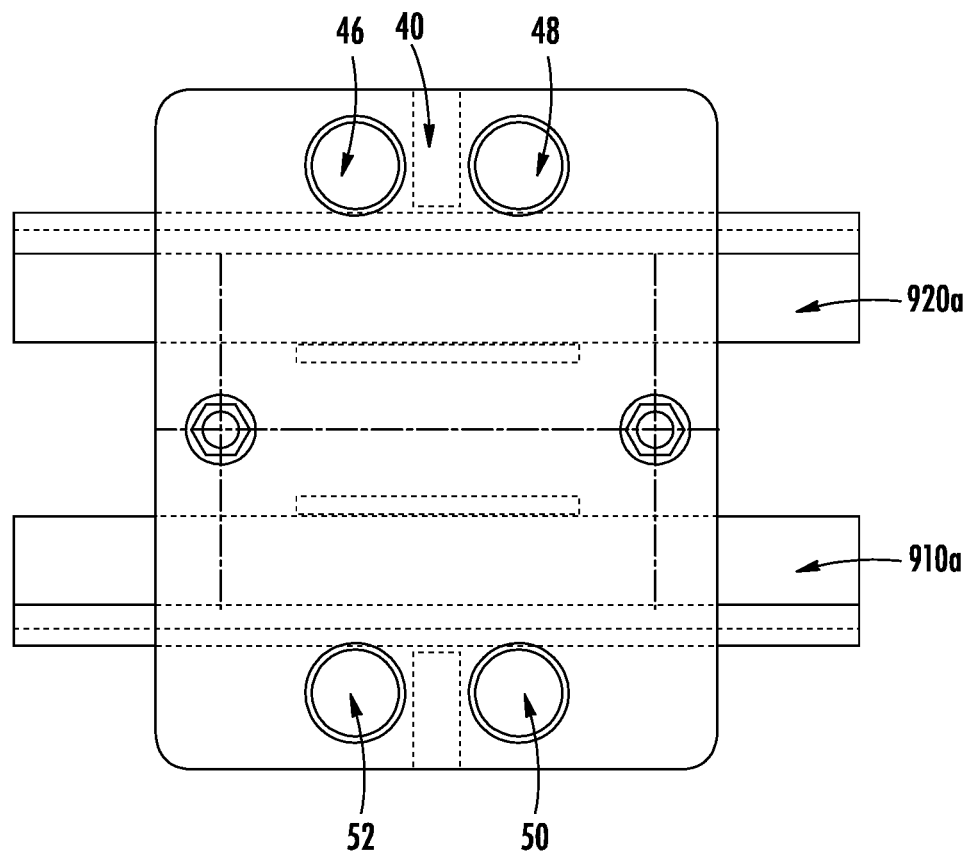
FIG. 8 is a top schematic view of the upper plate and rails of FIG. 7, according to an exemplary embodiment.

FIGS. 7 and 8 show trolley 110 according to an exemplary embodiment. Trolley 110 is substantially the same as trolley 10 except for the differences discussed herein. Trolley 110 includes upper plate 120, which defines height 128.

In one embodiment trolley 110 does not include supplemental plates 34 that are coupled to upper plate 20. To compensate for this configuration, height 128 of upper plate 120 is greater than height 33 of upper plate 20.

Further modifications and alternative embodiments of various aspects of this disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended to include one or more components or elements, and is not intended to be construed as meaning only one.

Various embodiments of the present disclosure relate to any combination of any of the features, and any such combination of features may be claimed in this or future applications. Any of the features, elements, or components of any of the exemplary embodiments discussed above may be utilized alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures. in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. A tow saddle comprising:
    a front portion configured to mount to a towing vehicle;
    a rear portion configured to mount to a towed vehicle, the rear portion coupled to the front portion, the rear portion comprising two rails that extend parallel to a longitudinal axis of the rear portion; and
    a trolley comprising:
        an upper plate extending between the two rails;
        a lower plate extending between the two rails;
        a fastener securing upper walls of each of the two rails between the lower plate and the upper plate;
        a rib protruding from the lower plate towards the upper plate, the rib positioned between the upper walls of the two rails; and
        a first supplemental plate secured to a top surface of the upper plate.

2. The tow saddle of claim 1, wherein the fastener extends a first distance above the upper plate and the fastener extends a second distance above the first supplemental plate that is less than the first distance.

3. The tow saddle of claim 1, comprising:
    a first support bar coupled to the upper plate directly below the first supplemental plate such that a vertical axis intersects the first support bar and the first supplemental plate; and
    a chain interfacing against the first support bar, the chain configured to couple the trolley to the towed vehicle.

4. The tow saddle of claim 1, wherein the rib defines a longitudinal axis that is parallel to the longitudinal axis of the rear portion.

5. A tow saddle comprising:
    a front portion configured to mount to a towing vehicle;
    a rear portion configured to mount to a towed vehicle, the rear portion coupled to the front portion, the rear portion comprising two rails that extend parallel to a longitudinal axis of the rear portion; and
    a trolley comprising:
        an upper plate extending between the two rails;
        a lower plate extending between the two rails;
        a fastener securing upper walls of each of the two rails between the lower plate and the upper plate;
        a rib protruding from the lower plate towards the upper plate, the rib positioned between the upper walls of the two rails;
        a first support bar coupled to the upper plate; and
        a chain interfacing against the first support bar, the chain configured to couple the trolley to the towed vehicle.

6. The tow saddle of claim 5, wherein the first support bar defines a longitudinal axis that is perpendicular to the longitudinal axis of the rear portion.

7. The tow saddle of claim 5, wherein the first support bar is outside an outer periphery of the rear portion.

8. The tow saddle of claim 5, comprising a second support bar coupled to the upper plate, the chain interfacing against the second support bar.

9. A tow saddle comprising:
    a front portion configured to mount to a towing vehicle;
    a rear portion configured to mount to a towed vehicle, the rear portion coupled to the front portion; and
    a trolley coupled to the rear portion, the trolley comprising:
        an upper plate secured to the rear portion;
        a first support bar coupled to a bottom surface of the upper plate, the first support bar coupled to the upper plate outside an outer periphery of the rear portion on a first side of the rear portion;
        a second support bar coupled to the bottom surface of the upper plate, the first support bar coupled to the upper plate outside the outer periphery of the rear portion on a second side of the rear portion opposite the first side; and
        a lower plate coupled to the upper plate and the rear portion, the bottom surface of the upper plate facing towards the lower plate.

10. The tow saddle of claim 9, comprising a first supplemental plate secured to a top surface of the upper plate above the first support bar such that a first vertical axis intersects the first support bar and the first supplemental plate.

11. The tow saddle of claim 10, comprising a second supplemental plate secured to the top surface of the upper plate above the second support bar such that a second vertical axis intersects the second support bar and the second supplemental plate.

12. The tow saddle of claim 10, comprising a chain interfacing against the first support bar, the chain configured to couple the trolley to the towed vehicle.

13. The tow saddle of claim 9, wherein the first support bar defines a longitudinal axis that is perpendicular to a longitudinal axis of the rear portion.

14. A tow saddle comprising:
   a front portion configured to mount to a towing vehicle;
   a rear portion configured to mount to a towed vehicle, the rear portion coupled to the front portion;
   a trolley coupled to the rear portion, the trolley comprising:
      an upper plate defining a top surface and a bottom surface opposite the top surface;
      a supplemental plate secured to the top surface of the upper plate;
      a first support bar coupled to the bottom surface of the upper plate;
      a lower plate, the bottom surface of the upper plate facing towards the lower plate;
      a fastener securing the lower plate and the upper plate to the rear portion; and
      a flexible elongate component configured to couple the trolley to the towed vehicle, the flexible elongate component interfacing against the first support bar.

15. The tow saddle of claim 14, wherein the supplemental plate is coupled to the upper plate above the first support bar such that a first vertical axis intersects the first support bar and the supplemental plate.

16. The tow saddle of claim 14, wherein the first support bar defines a longitudinal axis that is perpendicular to the longitudinal axis of the rear portion.

17. The tow saddle of claim 14, wherein the first support bar is outside an outer periphery of the rear portion.

18. The tow saddle of claim 17, wherein the fastener extends a first distance above the upper plate and the fastener extends a second distance above the supplemental plate that is less than the first distance.

19. The tow saddle of claim 14, wherein the supplemental plate covers less than 50% of a surface area of the top surface of the upper plate.

* * * * *